June 8, 1965 L. J. O'BRIEN ETAL 3,187,567
FLUID FLOW INDICATING METHOD AND APPARATUS FOR WELL BORES
Filed Nov. 16, 1961 3 Sheets-Sheet 1

INVENTORS.
LEO. J. O'BRIEN
GEORGE G. BERNARD
BY
*Edward H. Lang*
ATTORNEY.

June 8, 1965 L. J. O'BRIEN ETAL 3,187,567
FLUID FLOW INDICATING METHOD AND APPARATUS FOR WELL BORES
Filed Nov. 16, 1961 3 Sheets-Sheet 2

INVENTORS.
LEO J. O'BRIEN
GEORGE G. BERNARD
BY
Edward H. Fang
ATTORNEY.

United States Patent Office 3,187,567
Patented June 8, 1965

3,187,567
FLUID FLOW INDICATING METHOD AND
APPARATUS FOR WELL BORES
Leo J. O'Brien and George G. Bernard, both of Crystal Lake, Ill., assignors to The Pure Oil Company, Chicago, Ill., a corporation of Ohio
Filed Nov. 16, 1961, Ser. No. 152,729
8 Claims. (Cl. 73—155)

This invention relates to studying well bores and, more particularly, to an apparatus and method for determining the identity, location and direction of a fluid flowing between a well bore and a subterranean formation traversed by the well bore.

Frequently it is desirable to obtain information concerning the flow of fluid between a well bore and a subterranean formation. The desired information may be the identity of the fluid, point of influx, and direction of influx. For example, the production rate of oil from a producing well may be adversely affected by a producing formation containing water-bearing strata, and/or oil-bearing strata of varying permeabilities, with the flow of oil being restricted from the strata of low permeability. Frequently, the proportion of water or brine produced with the crude oil becomes such that the cost of further production of oil becomes excessive, particularly since the water-oil ratio is usually increased during the well life. It is then necessary to take corrective measures to improve oil production by sealing the water-bearing strata and fracturing or otherwise increasing the permeability of the oil-bearing strata of low permeability. However, before this can be done, it is necessary to accurately determine the locations of the strata to be sure that an oil-bearing stratum has been fractured, it is frequently desirable to determine the location and direction of the fractures. Similarly, in water-injection processes for the secondary recovery of petroleum from subterranean reservoirs, the location of thief zones in the formation which is flooded must be determined in order that they can be sealed to avoid their adverse effects.

This invention is directed to a novel apparatus and method for identifying fluids flowing into a well bore and for determining the location and direction of the flow of fluid between a well bore and a formation traversed by injection or producing wells. In accordance with this invention, an apparatus comprising a stacked plurality of annular-shaped test sections having a fluid passageway through the center thereof is positioned in a well bore adjacent to the formation under study. The test sections are divided by vertical, fluid-impermeable, radially-extending separators into a plurality of sector chambers which contain a material soluble in the fluid for which the characteristics are to be determined. The fluid flowing between the formation and the fluid passageway flows through the material in the sector chambers and the characteristics of the flowing fluid are determined as a function of the ratios of loss in weight of the fluid-soluble material in the sector chambers.

It is an object of this invention to provide an apparatus and method of identifying a fluid flowing into a well bore.

Another object of this invention is to provide an apparatus and method for determining the location and direction of fractures in formations traversed by injection or producing wells.

Another object of this invention is to provide an apparatus and method for determining the location of fluid-producing strata traversed by a well bore.

Other objects of this invention will become apparent as the description proceeds.

The invention is best described with reference to the drawings in which.

Figure 1:
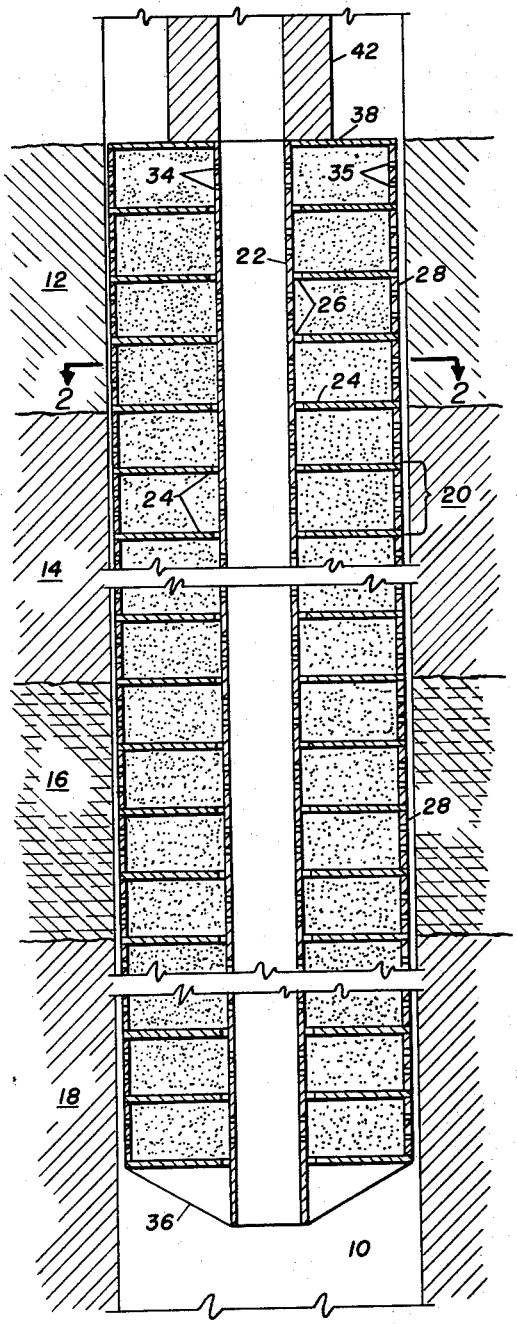
FIGURE 1 is an elevation view in cross section showing the apparatus of this invention positioned in a well bore.
Figure 13:
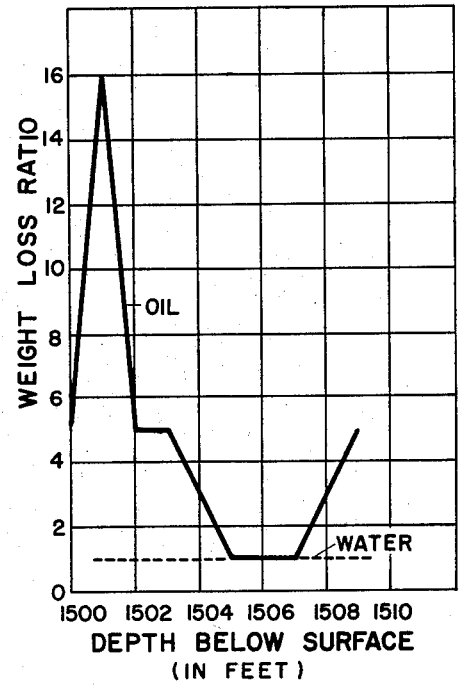
Figure 14:
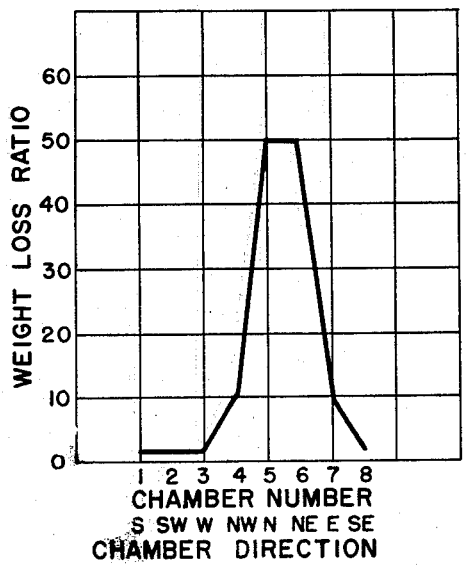

FIGURE 13 is a graphic representation of data obtained through the use of the instrument shown in FIGURE 1, showing the formation traversed by the well bore after the oil-bearing stratum of low permeability was fractured and the water-bearing stratum was sealed; and FIGURE 14 is a graphic representation of data obtained through the use of the instrument shown in FIGURE 1 showing the direction in which the oil-bearing stratum was fractured.

Figure 2:
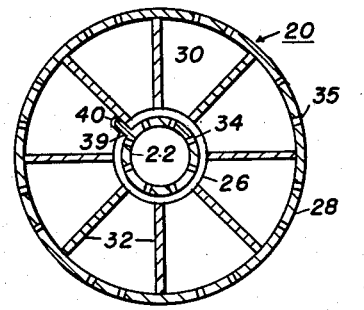
FIGURE 2 is a transverse cross-sectional view of the test sections shown in FIGURE 1, without the fluid-soluble solid, and taken along the line 2—2.

Referring to the drawings, particularly FIGURES 1 and 2, one embodiment of the test apparatus of this invention is illustrated positioned in well bore 10 opposite the producing formation. The producing formation under study is comprised of oil-bearing stratum of relatively low permeability 12, oil-bearing stratum of relatively high permeability 14, water-bearing stratum 16, and oil-bearing stratum of relatively high permeability 18. The assembled test apparatus of this invention consists of a stacked plurality of test sections 20 positioned around tubular conduit 22. Test sections 20 each have a fluid-impermeable, washer-shaped base member 24. Base members 24 have inner holes 26 slightly larger than the outer diameter of tubular conduit 22 so they are freely slidable thereon and outer diameters less than that of well bore 10. In FIGURES 1 and 2, the size of inner holes 26 are exaggerated for clarity. A cylindrical shell 28 is affixed at its bottom edge to the periphery of each base member 24 to form an annular chamber between tubular conduit 22 and cylindrical shell 28. Each of the test sections 20 are divided into a plurality of sector chambers 30 of substantially equal dimensions by a plurality of fluid-impermeable radially-extending separators 32 extending from cylindrical shell 28 to inner hole 26. Radially-extending separators 32, which are of the same height as cylindrical shells 28, are affixed to cylindrical shells 28 and base members 24. Tubular conduit 22 and cylindrical shells 28 are provided with lateral perforations 34 and 35, respectively, between adjacent base members 24 and radial walls 32. Before the test apparatus is assembled, sector chambers 30 are filled with a known quantity of a material soluble in the fluid of which the characteristics, i.e., identity, location of influx, and direction of influx, are to be determined. The test apparatus is assembled by sliding a plurality of test sections 20 around tubular conduit 22 so that the total height of the assembled test apparatus is at least equal to the height of the formation, or portion thereof, under study. The lowermost test section 20 is held in place by any suitable method such as by resting on support 36 affixed to the lowermost portion of tubular conduit 22. The remainder of test sections 20 are each supported by resting on the adjacent lower test section 20. The uppermost test section 20 is covered by a washer-shaped cover 38, having dimensions the same as those of the base members 24 of test sections 20. In assembling the test apparatus, it is preferred that test sections 20 be so positioned that radially-extending separators 32 of all of test sections 20 be in the same planes. This may be facilitated by the provision of a protrusion on tubular conduit 22 with corresponding indentations 40 in base members 24 adjacent to inner hole 26. The assembled test apparatus is supported in well bore 10 by macaroni-tubing string 42 by any suitable method (not shown to simplify the illustration).

Figure 3:
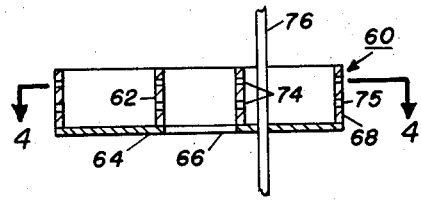
FIGURE 3 is an elevation view in cross section of another embodiment of the test section as it would appear in an assembled apparatus.
Figure 4:
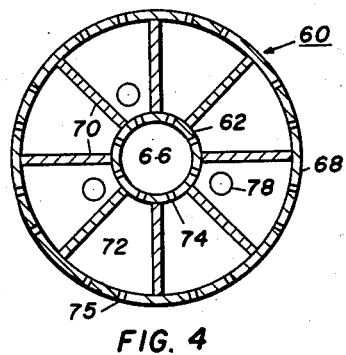
FIGURE 4 is a transverse cross-sectional view of the test sections shown in FIGURE 3, taken along the line 4—4.

FIGURES 3 and 4 show an alternative construction of the apparatus of this invention. In this embodiment, test sections 60 are similar to those previously described in relation to FIGURES 1 and 2 except that the fluid passageway through the center of the assembled apparatus is a plurality of tubular conduit segments 62 extending between fluid-impermeable washer-shaped base members 64 at inner holes 66. Also extending between adjacent base members 64 are cylindrical shells 68 at the peripheries thereof, and fluid-impermeable radially-extending separators 70 which divide the spaces between tubular conduit segments 62 and cylindrical shells 68 into a plurality of sector chambers 72. Tubular conduit segments 62, cylindrical shells 68, and radially-extending separators 70 are preferably affixed to base members 64 at the bottom edges thereof and radially-extending separators 70 are preferably affixed to tubular conduit segments 62 and cylindrical shells 68 to form integral test sections 60. Tubular conduit segments 62 and cylindrical shells 68 have a plurality of apertures 74 and 75, respectively, extending through the walls thereof to form a fluid passageway through sector chambers 72. A plurality of test sections 60 can be held together by positioning them around a tubular conduit extending within tubular conduit segments 62, as described in relation to the previously described embodiment. The tubular conduit must have a plurality of apertures extending through its wall which are in such locations as to register with apertures 74 in the walls of tubular conduit segments 62. However, since the tubular conduit segments 62 of a stacked plurality of test sections 60 form a fluid passageway, it is not necessary to provide an additional tubular conduit. The illustrated method of holding a plurality of test sections 60 together is to pass at least one rod-like member 76 through aligned holes 78 in base members 64 and providing a suitable means for securing rod-like member 76 to at least the topmost and bottommost test sections 60. Rod-like members 76 can be secured by nuts engaging threaded extremities of rod-like members 76 extending out of the topmost and bottommost test sections 60.

Figure 5:
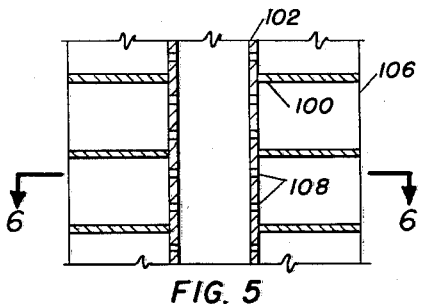
FIGURE 5 is an elevation view in cross section of a third embodiment of the apparatus of this invention.
Figure 8:
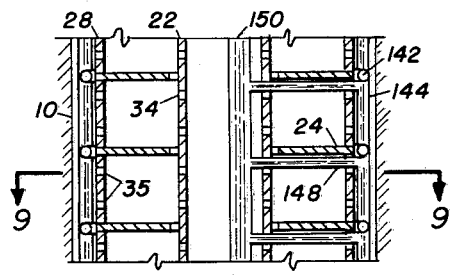
FIGURE 8 is an elevation view in cross section of still another embodiment of this invention utilizing sealing members to engage the walls of a well bore in fluid-tight relationship.
Figure 6:
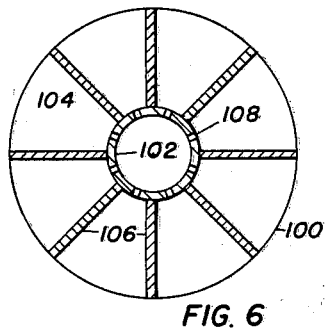
FIGURE 6 is a transverse cross-sectional view of the embodiment shown in FIGURE 5, taken along the line 6—6.
Figure 9:
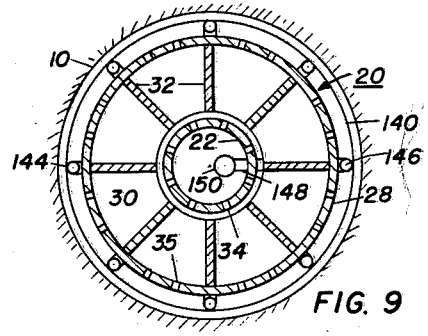
FIGURE 9 is a transverse cross-sectional view of the test sections shown in FIGURE 8, taken along the line 9—9.

Another embodiment of the apparatus of this invention is illustrated in FIGURES 5 and 6. A plurality of fluid-impermeable, washer-shaped members 100 are axially spaced along the length of tubular conduit 102 and affixed thereto. The space between each pair of washer-shaped members 100 is divided into a plurality of sector chambers 104 by vertical, fluid-impermeable, radially-extending separators 106 extending between the washer-shaped members 100 from the extremities thereof to tubular conduit 102. Radially-extending separators 106 are affixed to washer-shaped members 100 and tubular conduit 102. Each sector chamber 104 communicates with the center of tubular conduit 102 by a plurality of lateral perforations 108 through the wall of tubular conduit 102.

Figure 7:
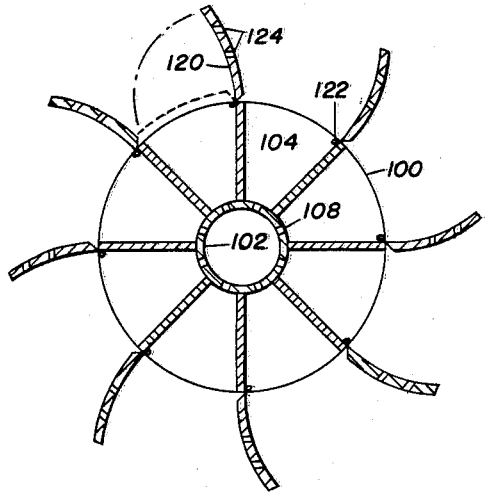
FIGURE 7 is a transverse cross-sectional view of a fourth embodiment of the apparatus of this invention.
Figure 10:
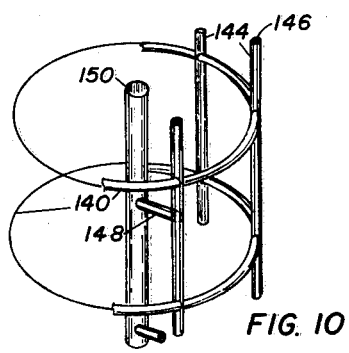
FIGURE 10 is a fragmentary isometric view of the sealing members of the embodiment of this invention shown in FIGURE 8.
Figure 11:
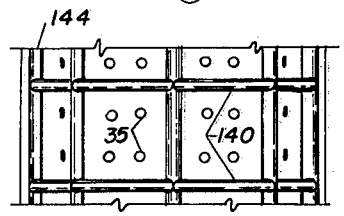
FIGURE 11 is a side elevational view of the embodiment shown in FIGURE 8.

A still further embodiment is shown in FIGURE 7. This embodiment is similar to that illustrated in FIGURES 5 and 6 except that the apparatus is enclosed by a cylindrical cover around the peripheries of washer-shaped members. The cylindrical cover is comprised of a plurality of arc-shaped segments 120 pivotally mounted at the ends of radially-extending separators 106 by hinges 122. Segments 120 are provided with perforations 124 to permit the flow of fluid therethrough. In utilizing this embodiment, the fluid-soluble material is inserted in sector chambers 104 and then segments are closed, as shown in dotted lines, before the apparatus is inserted in the well bore. It will be evident that suitable hatches can be provided to retain segments 120 in the closed position.

In some wells, it may be desirable to prevent the vertical or horizontal flow of oil and/or water leaving the formation before it passes through the sector chambers by the provision of sealing members that engage the walls of the well bore in fluid-tight relationship. The sealing members are affixed to the outside of the apparatus aligned with the washer-shaped members and the radially-extending separators. They are preferably of a material inert to the well fluids. The positioning of the apparatus in the well bore is facilitated by the utilization of expandable sealing members. In this modification, the diameter of the apparatus, including the sealing members in an unexpanded condition, is less than the diameter of the well bore. The sealing members are expanded to engage the walls of the well bore after the apparatus has been positioned therein. An example of this modification is illustrated in FIGURES 8 to 11, inclusive. This modification is illustrated in connection with the embodiment shown in FIGURES 1 and 2 but can be used with any embodiment of this invention. Horizontal sealing members 140 having openings 142 are affixed to cylindrical shells 28 of each test section 20 in line with base members 24. Also affixed to cylindrical shells 28 are vertical sealing members 144 which are aligned with radially-extending separators 32. Vertical sealing members 144 have longitudinal openings 146. Openings 142 and 146 in horizontal sealing members 140 and vertical sealing members 144, respectively, of each test section 20 are interconnected. Horizontal sealing members 140 and vertical sealing members 144 are of a resilient material, such as rubber, which expands when fluid pressure is applied to openings 142 and 146. The interconnected openings in the sealing members of each test section 20 are connected to a fluid pressure source, not illustrated, by branch fluid pressure lines 148, which in turn are connected to fluid pressure line 150 in tubular conduit 22. The apparatus is lowered in well bore 10 until it is adjacent to the formation under study in the mannr previously described. Fluid pressure is applied to openings 142 and 146 by an air compressor located on the surface connected to fluid pressure line 150, causing sealing members 140 and 144 to expand and engage the walls of the well bore 10 in fluid-tight relationship.

To illustrate the instant invention in its application to the production study of oil wells in recovering oil from a subterranean formation through a producing well, a water to oil ratio of 10:1 is found to exist in the produced fluids. In addition, the oil production rate is lower than was anticipated at the specific time in the life of the field. It is suspected that the water is entering the well from a water-bearing stratum penetrated by the well, rather than uniformly from the full 20-feet depth of the producing formation, and that the producing formation contains one or more previously undetected oil-bearing strata of relatively low permeability. A study of drilling records has not revealed the existence of such strata, but it appears possible that completion procedures might have damaged the well. Consequently, the apparatus and method of this invention are utilized as follows:

The test apparatus is assembled as illustrated in FIGURE 1 by positioning twenty six-inch-high test sections 20 around tubular conduit 22. The test sections 20 are divided by radial walls 32 into eight sector chambers 30, as shown in FIGURE 2. In assembling the test apparatus, the sector chambers 30 in every other test section 20 are filled with weighted amounts of calcium sulfate while the sector chambers 30 in the intervening test sections 20 are filled with weighed amounts of pelleted naphthalene. The production from the well is interrupted, and the test assembly is attached to the end of a macaroni tubing string and lowered into the well bore 10 until it is adjacent to the producing formation. The string is lowered in such a manner that its geographical orientation and depth at each test section 20 is known. Production is then resumed and continued for 24 hours. During this period of time, the fluids which are recovered from the well flow through the fluid-soluble material contained in sector chambers 30 from portions of the producing formation adjacent thereto, up through tubular conduit 22, and thence through macaroni tubing string 42.

At the end of the test period, production is interrupted again while the assembly is withdrawn from the well. Then the fluid-soluble material is removed from each sector chamber 30, and the separate batches of fluid-soluble material from each sector chamber 30 are washed free of adhering oil, dried, and weighed. The naphthalene may be washed with a detergent and emulsifier, such as sodium dodecyl sulfonate, and the calcium sulfate may be washed with a hydrocarbon solvent, such as benzene. The weight loss of the water-soluble material and oil-soluble material from each of the sector chambers 30 is directly proportional to the amount of water or oil, respectively, which has flowed through each chamber from the formation section adjacent to it. The ratio between the weight losses from two different vertically or horizontally displaced sector chambers 30 is equal to the ratio between the amounts of water or oil flowing from the formation sections adjacent to the sector chambers 30. Plotting these ratios for the sector chambers 30, containing water-soluble material in any test section 20, i.e., in a horizontal plane, and for sector chambers 30, in a vertical plane also containing water-soluble material, gives two types of water-production profiles, in relative terms, for the formation. Similar plots of the ratios for the chambers containing oil-soluble material gives two types of oil-production profiles, in relative terms, for the formation. Comparison of the vertical water and oil-production profiles shows where corrective steps might be taken to reduce the water-production rates and increase the oil-production rate. The horizontal profiles for a specific test section 20 show directions from which abnormally high amounts of oil or water are entering the well, thereby indicating the presence and orientation of fractures.

Figure 12:
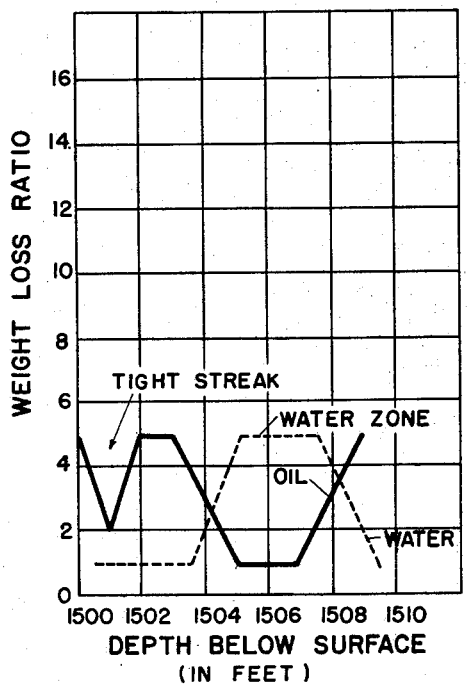
FIGURE 12 is a graphic representation of data obtained through the use of the instrument shown in FIGURE 1, showing that the formation traversed by the well bore includes an oil-bearing stratum of low permeability and a water-bearing stratum.

The weight loss and loss ratio for each of the sector chambers 30, obtained by the instant study, are shown in Table I. FIGURE 12, which is a plot of the total weight-loss ratio in Table I, shows the presence of an oil-bearing stratum of relatively low permeability 12 at about 1,501 feet, and the presence of a water-bearing stratum 16 at about 1,505 to 1,507 feet.

As a result of this test, it is decided to stimulate oil production by fracturing the formation at a depth of 1,501 feet and to suppress water production by cementing the well from 1,505 feet to 1,507 feet. After these treatments have been completed, the apparatus used previously is re-charged with weighed amounts of calcium sulfate and naphthalene, as was done previously, and the test assembly is again lowered into the well and positioned adjacent to the producing formation. Then production is resumed and continued for 24 hours. Production is then again interrupted while the assembly is withdrawn from the well and the solid from each chamber is washed free of oil, dried and weighed. The results are shown in Table II and FIGURES 13 and 14.

Referring to FIGURE 13, it is apparent that the water-bearing stratum 16 has been effectively sealed since the water production rate is uniform over the entire depth of the formation. It is also apparent that at least one fracture has been created at 1,501 feet, because of the very high oil production rate relative to the rest of the formation. Referring to FIGURE 14, which is a plot of the weight-loss ratios in sector chambers 30 of test section 20, which was located at 1,501 feet, it is apparent that the fractures extend approximately north northeast from the well.

As an alternative method of utilization of the apparatus of this invention, every other sector chamber 30 of each test section 20 is filled with a weighed amount of a water-soluble, oil-insoluble material, and a weighed amount of oil-soluble, water-insoluble material is placed in each of the intervening sector chambers 30. In assembling the test apparatus, adjacent test sections 20 are so positioned that vertically the sector chambers 30 alternately contain water-soluble, oil-insoluble material and oil-soluble, water-insoluble material. Thus, a checkerboard of water-soluble and oil-soluble materials is obtained.

In general, this invention is intended to encompass an apparatus and method of determining the identity, location, and direction of fluid flow between a well bore and a subterranean formation by positioning in the well bore opposite the formation under study a test apparatus comprising a fluid passageway surrounded by a stacked plurality of annular-shaped test sections divided by fluid impermeable, radially extending separators into a plurality of sector chambers of substantially equal dimensions containing fluid-soluble materials. The sector chambers have perforations in the outer walls adjacent to the formation, and perforations are also provided in the wall between the sector chambers and the fluid passageway. The fluid flowing between the well bore and a portion of the formation passes through only the material in the sector chamber adjacent to that portion of the formation. The desired information is obtained as a function of the weight-loss ratios between fluid-soluble materials in vertically or horizontally displaced sector chambers. Mechanical embodiments may be changed without departing from the invention. The apparatus may be used both in producing wells and in injection wells utilized in secondary-recovery operations.

The optimum length of the test period is dependent upon the production rate, the amount of water in the produced fluids, the oil-production rate from the loose and tight zones, and the solubility characteristics of the solids selected for use. Solids having low solubilities are used where long test periods are desired to average the conditions over a long period of production. On the other hand, solids having relatively high solubilities are used where short test periods are necessary for economic or other reasons. The oil-soluble, water-insoluble materials used in connection with the apparatus of this invention may be any suitable organic material such as naphthalene, paraffin wax, and the like. The water-soluble, oil-insoluble materials utilized may be calcium sulfate, sodium chloride, sodium sulfate, and the like.

Table I

| Test section number | Depth from surface (feet) | Solid | Chamber 1 Loss | Ratio | Chamber 2 Loss | Ratio | Chamber 3 Loss | Ratio | Chamber 4 Loss | Ratio | Chamber 5 Loss | Ratio | Chamber 6 Loss | Ratio | Chamber 7 Loss | Ratio | Chamber 8 Loss | Ratio | Total Loss | Ratio |
|---|---|---|---|---|---|---|---|---|---|---|---|---|---|---|---|---|---|---|---|---|
| 1 | 1,500 | Naphthalene | .05 | 5 | .05 | 5 | .05 | 5 | .05 | 5 | .05 | 5 | .05 | 5 | .05 | 5 | .05 | 5 | .40 | 5 |
| 2 | 1,500.5 | Sulfate | .01 | 1 | .01 | 1 | .01 | 1 | .01 | 1 | .01 | 1 | .01 | 1 | .01 | 1 | .01 | 1 | .08 | 1 |
| 3 | 1,501 | Naphthalene | .02 | 2 | .02 | 2 | .02 | 2 | .02 | 2 | .02 | 2 | .02 | 2 | .02 | 2 | .02 | 2 | .16 | 2 |
| 4 | 1,501.5 | Sulfate | .01 | 1 | .01 | 1 | .01 | 1 | .01 | 1 | .01 | 1 | .01 | 1 | .01 | 1 | .01 | 1 | .08 | 1 |
| 5 | 1,502 | Naphthalene | .05 | 5 | .05 | 5 | .05 | 5 | .05 | 5 | .05 | 5 | .05 | 5 | .05 | 5 | .05 | 5 | .40 | 5 |
| 6 | 1,502.5 | Sulfate | .01 | 1 | .01 | 1 | .01 | 1 | .01 | 1 | .01 | 1 | .01 | 1 | .01 | 1 | .01 | 1 | .08 | 1 |
| 7 | 1,503 | Naphthalene | .05 | 5 | .05 | 5 | .05 | 5 | .05 | 5 | .05 | 5 | .05 | 5 | .05 | 5 | .05 | 5 | .40 | 5 |
| 8 | 1,503.5 | Sulfate | .01 | 1 | .01 | 1 | .01 | 1 | .01 | 1 | .01 | 1 | .01 | 1 | .01 | 1 | .01 | 1 | .08 | 1 |
| 9 | 1,504 | Naphthalene | .03 | 3 | .03 | 3 | .03 | 3 | .03 | 3 | .03 | 3 | .03 | 3 | .03 | 3 | .03 | 3 | .24 | 3 |
| 10 | 1,504.5 | Sulfate | .03 | 3 | .03 | 3 | .03 | 3 | .03 | 3 | .03 | 3 | .03 | 3 | .03 | 3 | .03 | 3 | .24 | 3 |
| 11 | 1,505 | Naphthalene | .01 | 1 | .01 | 1 | .01 | 1 | .01 | 1 | .01 | 1 | .01 | 1 | .01 | 1 | .01 | 1 | .08 | 1 |
| 12 | 1,505.5 | Sulfate | .05 | 5 | .05 | 5 | .05 | 5 | .05 | 5 | .05 | 5 | .05 | 5 | .05 | 5 | .05 | 5 | .40 | 5 |
| 13 | 1,506 | Naphthalene | .01 | 1 | .01 | 1 | .01 | 1 | .01 | 1 | .01 | 1 | .01 | 1 | .01 | 1 | .01 | 1 | .08 | 1 |
| 14 | 1,506.5 | Sulfate | .05 | 5 | .05 | 5 | .05 | 5 | .05 | 5 | .05 | 5 | .05 | 5 | .05 | 5 | .05 | 5 | .40 | 5 |
| 15 | 1,507 | Naphthalene | .01 | 1 | .01 | 1 | .01 | 1 | .01 | 1 | .01 | 1 | .01 | 1 | .01 | 1 | .01 | 1 | .08 | 1 |
| 16 | 1,507.5 | Sulfate | .05 | 5 | .05 | 5 | .05 | 5 | .05 | 5 | .05 | 5 | .05 | 5 | .05 | 5 | .05 | 5 | .40 | 5 |
| 17 | 1,508 | Naphthalene | .03 | 3 | .03 | 3 | .03 | 3 | .03 | 3 | .03 | 3 | .03 | 3 | .03 | 3 | .03 | 3 | .24 | 3 |
| 18 | 1,508.5 | Sulfate | .03 | 3 | .03 | 3 | .03 | 3 | .03 | 3 | .03 | 3 | .03 | 3 | .03 | 3 | .03 | 3 | .24 | 3 |
| 19 | 1,509 | Naphthalene | .05 | 5 | .05 | 5 | .05 | 5 | .05 | 5 | .05 | 5 | .05 | 5 | .05 | 5 | .05 | 5 | .40 | 5 |
| 20 | 1,509.5 | Sulfate | .01 | 1 | .01 | 1 | .01 | 1 | .01 | 1 | .01 | 1 | .01 | 1 | .01 | 1 | .01 | 1 | .08 | 1 |

Table II

| Test section number | Depth from surface (feet) | Solid | Chamber 1 Loss | Ratio | Chamber 2 Loss | Ratio | Chamber 3 Loss | Ratio | Chamber 4 Loss | Ratio | Chamber 5 Loss | Ratio | Chamber 6 Loss | Ratio | Chamber 7 Loss | Ratio | Chamber 8 Loss | Ratio | Total Loss | Ratio |
|---|---|---|---|---|---|---|---|---|---|---|---|---|---|---|---|---|---|---|---|---|
| 1 | 1,500 | Naphthalene | .05 | 5 | .05 | 5 | .05 | 5 | .05 | 5 | .05 | 5 | .05 | 5 | .05 | 5 | .05 | 5 | .05 | 5 |
| 2 | 1,500.5 | Sulfate | .01 | 1 | .01 | 1 | .01 | 1 | .01 | 1 | .01 | 1 | .01 | 1 | .01 | 1 | .01 | 1 | .01 | 1 |
| 3 | 1,501 | Naphthalene | .02 | 2 | .02 | 2 | .02 | 2 | .10 | 10 | .50 | 50 | .50 | 50 | .10 | 10 | .02 | 2 | 1.28 | 16 |
| 4 | 1,501.5 | Sulfate | .01 | 1 | .01 | 1 | .01 | 1 | .01 | 1 | .01 | 1 | .01 | 1 | .01 | 1 | .01 | 1 | .08 | 1 |
| 5 | 1,502 | Naphthalene | .05 | 5 | .05 | 5 | .05 | 5 | .05 | 5 | .05 | 5 | .05 | 5 | .05 | 5 | .05 | 5 | .40 | 5 |
| 6 | 1,502.5 | Sulfate | .01 | 1 | .01 | 1 | .01 | 1 | .01 | 1 | .01 | 1 | .01 | 1 | .01 | 1 | .01 | 1 | .08 | 1 |
| 7 | 1,503 | Naphthalene | .05 | 5 | .05 | 5 | .05 | 5 | .05 | 5 | .05 | 5 | .05 | 5 | .05 | 5 | .05 | 5 | .40 | 5 |
| 8 | 1,503.5 | Sulfate | .01 | 1 | .01 | 1 | .01 | 1 | .01 | 1 | .01 | 1 | .01 | 1 | .01 | 1 | .01 | 1 | .08 | 1 |
| 9 | 1,504 | Naphthalene | .03 | 3 | .03 | 3 | .03 | 3 | .03 | 3 | .03 | 3 | .03 | 3 | .03 | 3 | .03 | 3 | .24 | 3 |
| 10 | 1,504.5 | Sulfate | .01 | 1 | .01 | 1 | .01 | 1 | .01 | 1 | .01 | 1 | .01 | 1 | .01 | 1 | .01 | 1 | .08 | 1 |
| 11 | 1,505 | Naphthalene | .01 | 1 | .01 | 1 | .01 | 1 | .01 | 1 | .01 | 1 | .01 | 1 | .01 | 1 | .01 | 1 | .08 | 1 |
| 12 | 1,505.5 | Sulfate | .01 | 1 | .01 | 1 | .01 | 1 | .01 | 1 | .01 | 1 | .01 | 1 | .01 | 1 | .01 | 1 | .08 | 1 |
| 13 | 1,506 | Naphthalene | .01 | 1 | .01 | 1 | .01 | 1 | .01 | 1 | .01 | 1 | .01 | 1 | .01 | 1 | .01 | 1 | .08 | 1 |
| 14 | 1,506.5 | Sulfate | .01 | 1 | .01 | 1 | .01 | 1 | .01 | 1 | .01 | 1 | .01 | 1 | .01 | 1 | .01 | 1 | .08 | 1 |
| 15 | 1,507 | Naphthalene | .01 | 1 | .01 | 1 | .01 | 1 | .01 | 1 | .01 | 1 | .01 | 1 | .01 | 1 | .01 | 1 | .08 | 1 |
| 16 | 1,507.5 | Sulfate | .01 | 1 | .01 | 1 | .01 | 1 | .01 | 1 | .01 | 1 | .01 | 1 | .01 | 1 | .01 | 1 | .08 | 1 |
| 17 | 1,508 | Naphthalene | .03 | 3 | .03 | 3 | .03 | 3 | .03 | 3 | .03 | 3 | .03 | 3 | .03 | 3 | .03 | 3 | .24 | 3 |
| 18 | 1,508.5 | Sulfate | .01 | 1 | .01 | 1 | .01 | 1 | .01 | 1 | .01 | 1 | .01 | 1 | .01 | 1 | .01 | 1 | .08 | 1 |
| 19 | 1,509 | Naphthalene | .05 | 5 | .05 | 5 | .05 | 5 | .05 | 5 | .05 | 5 | .05 | 5 | .05 | 5 | .05 | 5 | .40 | 5 |
| 20 | 1,509.5 | Sulfate | .01 | 1 | .01 | 1 | .01 | 1 | .01 | 1 | .01 | 1 | .01 | 1 | .01 | 1 | .01 | 1 | .08 | 1 |

The embodiments of this invention in which an exclusive property or privilege is claimed are defined as follows:

1. A method of determining the identity, location, and direction of a fluid flowing between a well bore and a subterranean formation surrounding said well bore which comprises positioning in said well bore a plurality of known quantities of a material soluble in said fluid in a manner such that the geographical location of each of said quantities is known, each of said quantities horizontally and vertically segregated from each other and adjacent to a portion of said formation, allowing said fluid flowing between said well bore and a portion of said formation to flow through only the quantity adjacent said portion, determining the loss in weight of each of said quantities and thereafter correlating said weight losses as to each predetermined geographical location.

2. An apparatus adapted to be inserted in a well bore for determining the characteristics of fluid flow within a well bore, comprising a tubular member having a continuous passage extending therethrough and a plurality of spaced lateral ports communicating between said passage and the exterior of said tubular member; a plurality of fluid-impermeable barriers coaxially spaced along the outside of said tubular member and having a diameter less than that of the well bore in which said apparatus is employed, said barriers having substantially centrally-located holes slightly larger than the outer dimension of said tubular member whereby said barriers are fully slidable on said tubular member; a plurality of fluid-impermeable radial separators between adjacent barriers substantially extending from said tubular member to the peripheries of said barriers; and a shell along the peripheries of said barriers comprising a plurality of tubular members, one member of said shell extending from each of said barriers to barriers adjacent thereto, said shell, separators and barriers forming a plurality of isolated sections communicating with said passage through at least one of said ports, said shell having a plurality of lateral ports registering with said isolated sections.

3. An apparatus according to claim 2 in which said tubular member has an elongated projection along the entire length of the outer wall thereof and each of said barriers has a notch adjoining the centrally-located holes thereof, said notches conforming to the shape of said projection.

4. An apparatus according to claim 2 including a plurality of resilient, fluid-impermeable sealing members on the exterior thereof and substantially aligned with said barriers and separators, said sealing members being adapted to co-operate with the walls of said well bore in fluid-tight relationship therewith.

5. An apparatus according to claim 4 in which said sealing members have a normal diameter less than that of said well bore and are adapted to be expanded to co-operate with the walls of said well bore in fluid-tight relationship therewith, and said apparatus includes means for expanding said sealing members.

6. An apparatus according to claim 5 in which said sealing members have openings therein and are adapted to be laterally expanded when said openings are filled with fluid, and said means for expanding said sealing members is a source of fluid connected to said openings.

7. An apparatus adapted to be inserted in a well bore for determining the characteristics of fluid flow between a well bore and a subterranean formation surrounding said well bore comprising a plurality of stacked, annular, open-topped, cylinders of substantially fluid-impermeable material, each cylinder having a bottom with a centrally-located hole sufficient in size to permit said cylinder to be freely slidable on a conduit hereinafter described, the side wall of said cylinder having spaced ports, said cylinder having fluid-impermeable radially-extending separator walls having the same height as the side cylinder wall whereby the coaction of each cylinder of the plurality with said separator walls forms isolated sections within the interior of each cylinder; an elongated conduit having a continuous passage extending therethrough and a plurality of spaced lateral ports aligned to register with said ports in said cylinders disposed in said centrally-located hole of said plurality of cylinders and means on the extremities of said conduit to maintain said plurality of cylinders in fixed position with respect to said conduit.

8. The apparatus in accordance with claim 7 wherein said separator walls divide the volume of said open-topped cylinder into at least eight equal portions.

References Cited by the Examiner

UNITED STATES PATENTS

| | | | |
|---|---|---|---|
| 1,854,517 | 4/32 | Layne | 166—236 |
| 1,976,217 | 10/34 | Diepenbrock | 166—235 |
| 2,646,126 | 7/53 | Goodner | 166—235 |
| 2,696,112 | 12/54 | Griffith | 73—155 |
| 2,781,663 | 2/57 | Maly et al. | 166—4 X |
| 2,814,947 | 12/57 | Stegemeier et al. | 166—4 X |
| 2,833,982 | 5/58 | Maly | 166—4 X |

BENJAMIN HERSH, *Primary Examiner.*

CHARLES E. O'CONNELL, *Examiner.*